Inventor
Francis H. Tennis

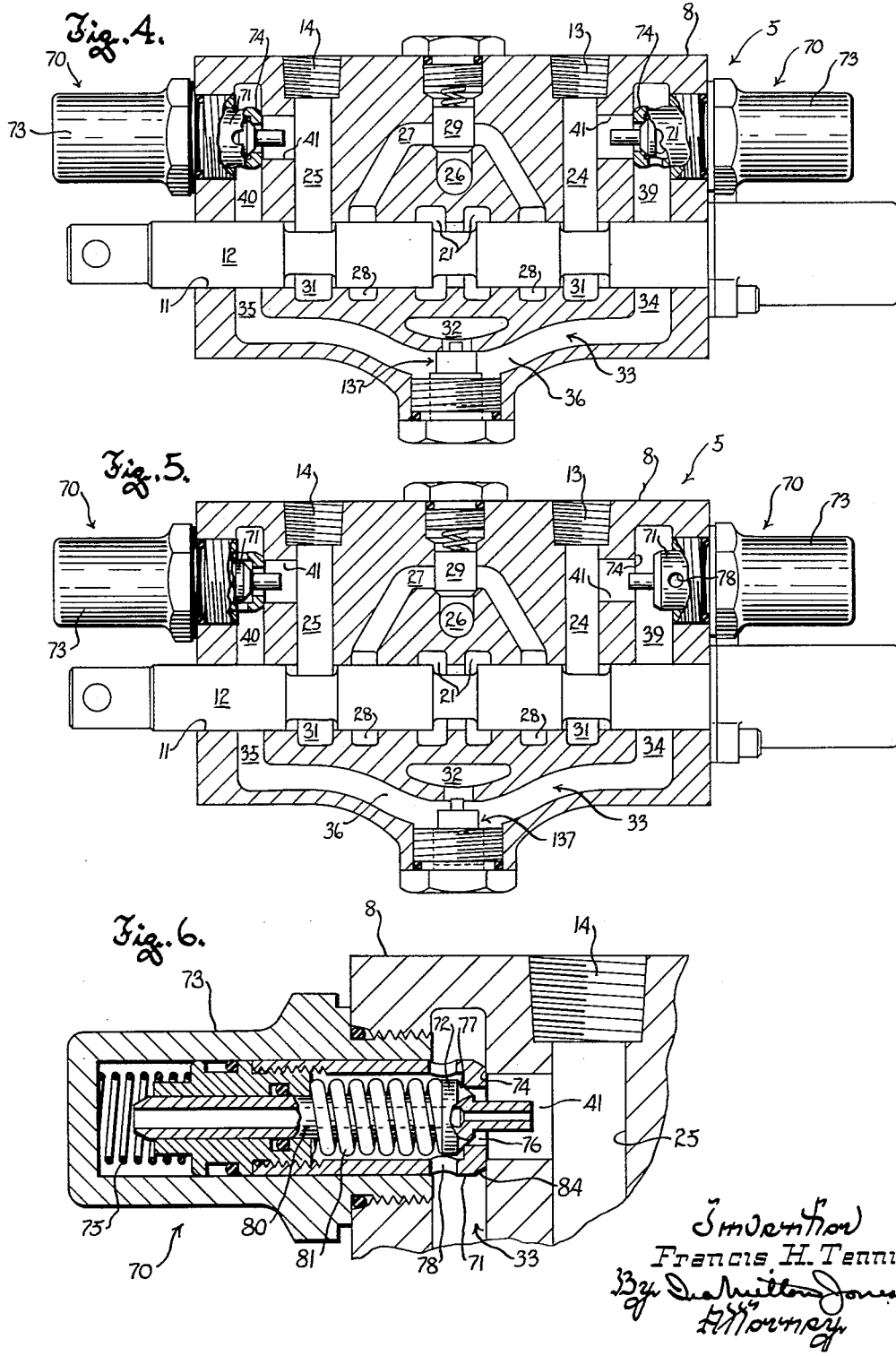

May 26, 1964     F. H. TENNIS     3,134,402
HYDRAULIC CONTROL VALVE HAVING VOID CONTROL MEANS
Filed April 30, 1962     5 Sheets-Sheet 5
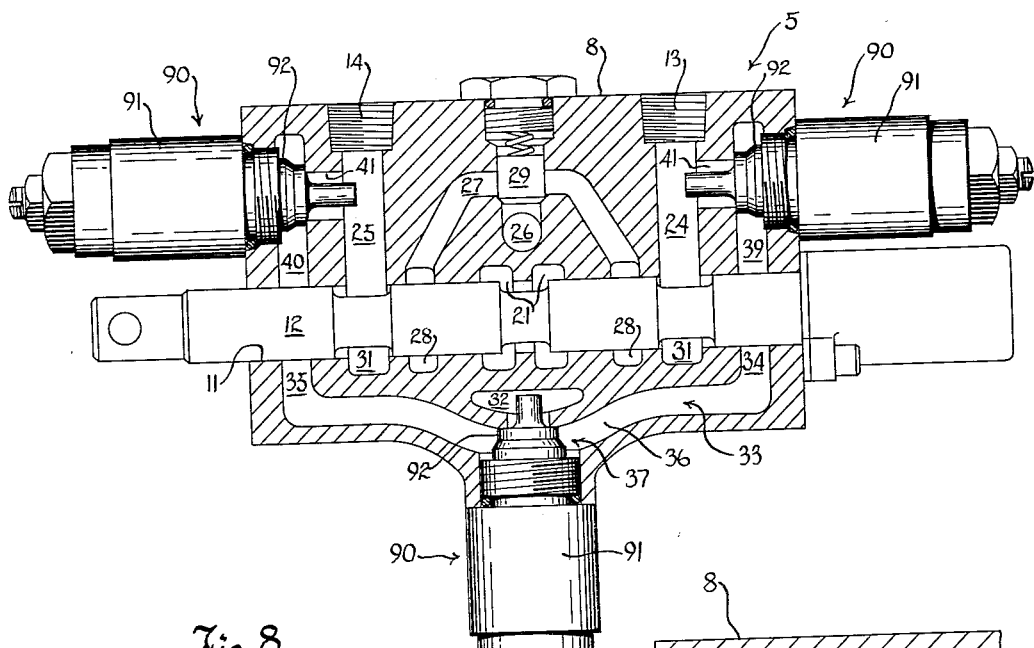
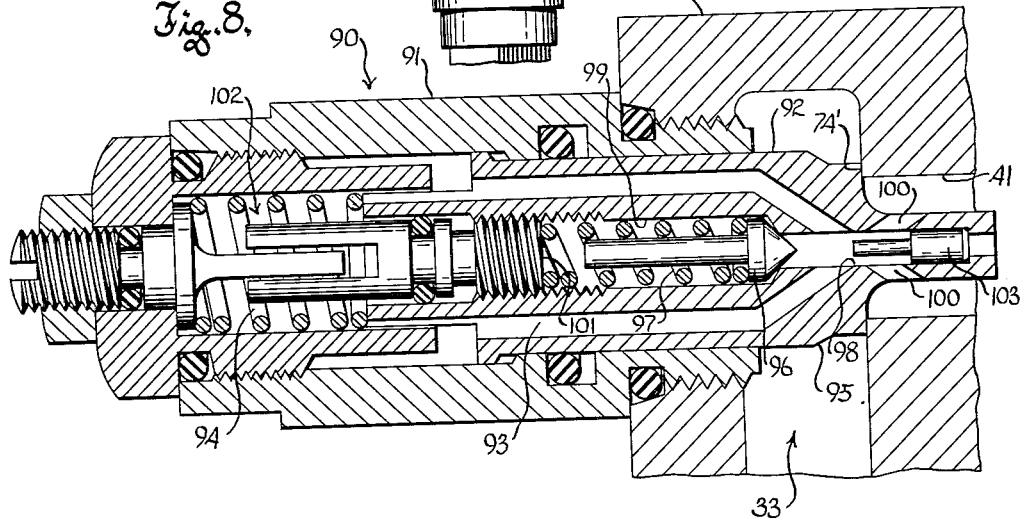

United States Patent Office 3,134,402
Patented May 26, 1964

3,134,402
HYDRAULIC CONTROL VALVE HAVING VOID
CONTROL MEANS
Francis H. Tennis, Milwaukee, Wis., assignor to Hydraulic Unit Specialties Company, Pewaukee, Wis., a corporation of Wisconsin
Filed Apr. 30, 1962, Ser. No. 191,163
10 Claims. (Cl. 137—596)

This invention relates to hydraulic control valves of the type wherein a valve element is shiftable in a bore in a valve body to either of two defined operating positions to selectively govern the direction of operation of a double acting hydraulic cylinder or similar reversible hydraulic motor; and the invention refers more particularly to anti-cavitation or void control means in a hydraulic control valve of that nature.

A hydraulic control valve of the type here under consideration comprises a body having therein a pressure fluid inlet connectable with a pump or other source of hydraulic fluid under pressure, a return fluid outlet connectable with a reservoir or the like, and one or more spool bores each having a pair of service passages leading therefrom to motor ports in the body that are connectable with the ports of a reversible hydraulic motor. In each spool bore there is a spool that is manually slidable in opposite directions from a neutral position to one or the other of a pair of operating positions. When the spool is in its neutral position it permits pressure fluid to flow from the inlet to the outlet for return to the reservoir; and in each of its operating positions the spool directs pressure fluid from the inlet to one of the service passages while communicating the other service passage with the outlet so that return fluid from a motor governed by the spool is sent back to the reservoir.

It often happens that a double acting hydraulic cylinder is employed to drive a mechanism that is subjected to substantial gravity or inertia loads which effect more rapid movement of the mechanism in one or both directions than it can be propelled by its hydraulic cylinder. Under these conditions, where the cylinder is driven by the load rather than driving it, the rate at which hydraulic fluid is supplied to the cylinder by the hydraulic pump may be insufficient to fill the void within the cylinder left by its rapidly moving piston, with undesirable consequences that are well known to those skilled in the art.

To prevent drawing of a void under these circumstances it has been customary to provide such hydraulic systems with so called anti-cavitation or void control check valves which are normally closed but which open when the hydraulic motor is driven by its load and the piston is tending to draw a void, and which then permit return fluid from one end of the cylinder to be transferred back to its other end along with the fluid supplied thereto by the pump.

Usually the void control check valves are located in the body of the control valve and are so arranged that there is a check valve in the body for each service passage at which a void may be drawn, each check valve controlling communication between its service passage and a passage in the body to which return fluid from the other service passage can flow. In some cases, as where a control valve governs a mechanism that is subjected only to gravity loads, a void control check valve is needed for only one of the service passages of the control valve since the mechanism tends to draw a void only when operating in one direction. However, to permit some degree of standardization of control valve bodies, a void control check valve is usually provided for each service passage in the body, for an unneeded void control check valve does not interfere with normal operation of the valve and adds relatively little cost to the assembly as compared with the convenience afforded by having the control valve standardized and adaptable to different installation situations.

Heretofore the conventional void control check valve comprised a ball or equivalent poppet cooperable with a seat that faced toward the direction of normally higher pressure, but which was forced off of its seat by a reversal of the normal pressure relationship. In other words, the seat of the check valve faced its associated service passage, and the higher fluid pressure normally obtaining in the service passage tended to maintain the poppet seated; but when pressure of fluid in the service passage dropped below that of return fluid, the poppet was unseated, moving in the direction in which it permitted flow to take place. A poppet of this type presents a substantial restriction to the flow that it permits, since fluid is always compelled to flow around it, and also around any spring that may be biasing it toward its seated position. But when a void is developing in a service passage it is obviously important that the flow of return fluid into such service passage should be as nearly free and unrestricted as possible.

With the foregoing in mind, it is an object of the present invention to provide, in a control valve of the character described, void control means associated with each service passage at which a void may tend to develop, which void control means is highly dependable, very rapid in operation, and presents substantially less restriction to void control flow of return fluid than prior void control means.

Another object of this invention is to provide void control means for controlling fluid flow between each service passage in the body of a control valve of the character described and an exhaust passage in the body to which return fluid is directed and which leads to an outlet connectable with a reservoir or the like, said void control means comprising a poppet that moves in a direction counter to the fluid flow that it permits and which thus offers a minimum of restriction to such flow.

A further object of this invention also has to do with the fact that a void control check valve element must open in response to a relatively small pressure differential. Where fluid from a return fluid passage is made available for void control, as in control valves embodying the present invention, and fluid in such return fluid passage is substantially at reservoir pressure, the void control check valve cannot open until a void is actually being drawn in its associated service passage.

With the foregoing in mind it is another object of this invention to provide, in a hydraulic control valve of the character described having one or more manually shiftable spools and a pair of void control check valves for each spool, means for insuring that back pressure will be maintained upon return fluid from either of the service passages controlled by the spool when such fluid enters the return fluid passage means in the valve body, to insure rapid opening of the void control check valve means when a void tends to be drawn in the other service passage, and which back pressure means does not interfere with operation of the control valve or a motor controlled thereby during normal operation of the motor.

It is also an object of this invention to provide back pressure control means of the character just described that is inexpensive to manufacture and install in a control valve body and that is adaptable both to valve bodies of the sectional type and to those of unitary construction.

In connection with the object last stated, it is another object of this invention to provide in a hydraulic control valve body a single flow restricting means for each of the valve spools in the body, which flow restricting means imposes a substantially uniform back pressure upon return fluid flowing from either of the service passages associated with the valve spool, whether such return fluid is flowing at a normal rate or at a high rate corresponding to conditions under which a void is being drawn.

In many cases where void control may be a problem, provision must also be made for relief of the high pressures that can develop in one or the other of the service passages when a heavy load is imposed upon the motor and the valve spool is in its neutral or holding position. Such pressures can reach values high enough to endanger the motor, the control valve, or the lines connecting the valve and motor, and hence it has been customary to provide a pressure relief valve associated with each service passage in which such high return fluid pressures can develop.

In some instances provision for this condition takes the form of a so-called cross-over relief arrangement, whereby high pressure return fluid from either service passage is transferred directly to the other through a by-pass controlled by a pressure relief valve. The usual arrangement heretofore used for such cross-over relief has comprised a separate relief valve and by-pass for each service passage, with each relief valve controlling the by-pass that communicated its associated service passage with the other. In early systems of this type the cross-over relief passage means and relief valves were incorporated in the hydraulic system outside the control valve body, but the general practice now is to incorporate them into the control valve itself. Obviously, where two cross-over relief by-passes and their associated relief valves had to be provided in the control valve body, the body had to be large enough to accommodate them.

In another arrangement, high pressure return fluid from either service passage was dumped to the return fluid passage through a by-pass controlled by a relief valve, and void control means were relied upon for transferring sufficient fluid into the other service passage from the return fluid passage to prevent drawing a void. Again, the present trend is to incorporate the relief valves and by-passes into the body of the control valve. The usual arrangement heretofore has been to have in the control valve body a U-shaped return fluid passage which comprised, in effect a pair of branches of an exhaust passage or header that opened to the body outlet. The bight portion of the return fluid passage was disposed at the side of the spool bore remote from the service passages, and its legs extended to the opposite side of the spool bore to parallel portions of the service passages. The service passages were similarly extended beyond the spool bore, into the portion of the valve body that contained the bight portion of the return fluid passage. Each service passage was communicable through a pair of by-passes with its adjacent branch of the return fluid passage, there being one such by-pass at each side of the spool bore. One of these two by-passes for each service passage was of course controlled by a check valve and the other by a high pressure relief valve. The two check valves and two relief valves in each spool valve section, controlling the four by-pass passages, naturally required the valve body to be substantially large.

By contrast with the above described prior arrangements the present invention has as another of its objects the provision of a control valve incorporating relief and void control means for each service passage in the valve body, cooperating with flow restricting means of the type above referred to, and wherein the valve body can be substantially smaller than control valves of the prior types incorporating such provisions for cross-over relief of high pressure relief and void control.

In this connection it is another and more specific object of this invention to provide a control valve of the character described which features unusual compactness by reason of the fact that it incorporates subassemblies of the type disclosed in the copending applications of Francis H. Tennis, Serial No. 153,415, filed November 17, 1961, for Pilot Operated Pressure and Vacuum Relief Valve, now Patent No. 3,100,503 issued August 13, 1963, and of Francis H. Tennis and Donald G. Bethke, Serial No. 186,906, filed April 12, 1962, for Combined High Pressure Relief and Void Control Valve.

It follows that it is a further object of this invention to provide in a control valve of the character described a single by-pass for each service passage, for communicating the service passage with its adjacent branch of a U-shaped low pressure fluid passage, the bight of which opens to an outlet in the valve body, and a single subassembly in each by-pass comprising a combined high pressure relief and void control valve which performs all of the needed cross-over relief and void control functions, and features a check valve element which moves in the direction counter to that in which it permits fluid flow.

With the above and other objects in view which will appear as the description proceeds, this invention resides in the novel construction, combination and arrangement of parts substantially as hereinafter described and more particularly defined by the appended claims, it being understood that such changes in the precise embodiments of the hereindisclosed invention may be made as come within the scope of the claims.

The accompanying drawings illustrate several complete examples of physical embodiments of the invention constructed according to the best modes so far devised for the practical application of the principles thereof, and in which:

FIGURES 4 and 5 are views similar to FIGURE 2 but showing a control valve incorporating another modified embodiment of the invention which provides for high pressure and cross-over relief as well as void control;

FIGURE 6 is a view on an enlarged scale of a portion of the control valve shown in FIGURES 4 and 5;

FIGURE 7 is a view similar to FIGURE 2 but showing another modified embodiment of the control valve; and FIGURE 8 is a view on an enlarged scale of a portion of the control valve shown in FIGURE 7.

Referring now more particularly to the accompanying drawings, the numeral 5 designates generally the body of a hydraulic control valve which for purposes of illustration is shown as being of sectional construction, although it will be understood that the invention is as well applicable to valves of unitary construction. The control valve body is conventional in having an inlet manifold section 6, an outlet manifold section 7 and one or more individual control or spool sections 8 and 9 which are assembled in stacked relationship with one another and with the inlet and exhaust sections, the latter being at opposite ends of the stack. Obviously the two spool sections shown are illustrative, since there might be only one such section in the stack or any number of them.

Figure 2:
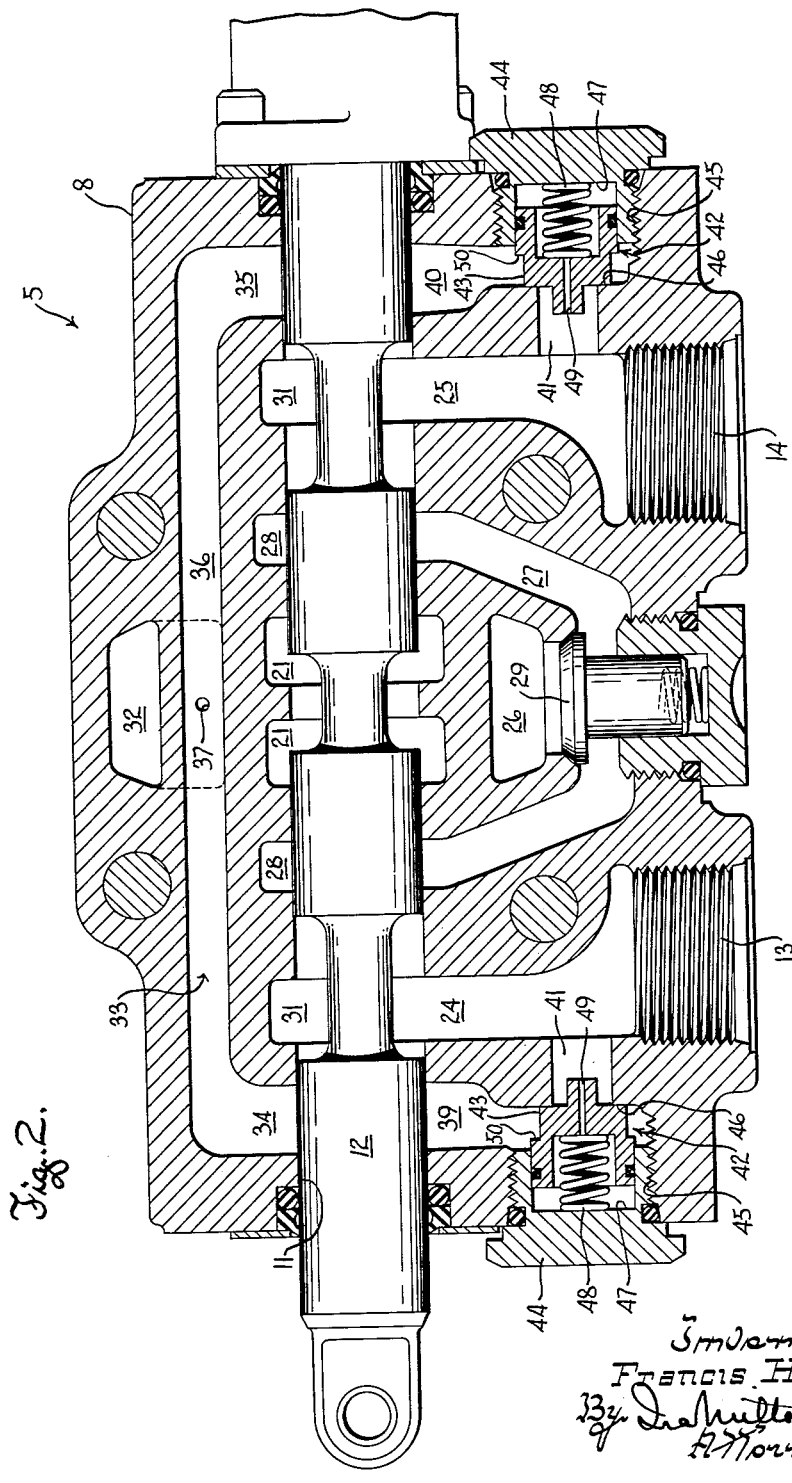
FIGURE 2 is a sectional view taken on the plane of the line 2—2 in FIGURE 1.
Figure 3:
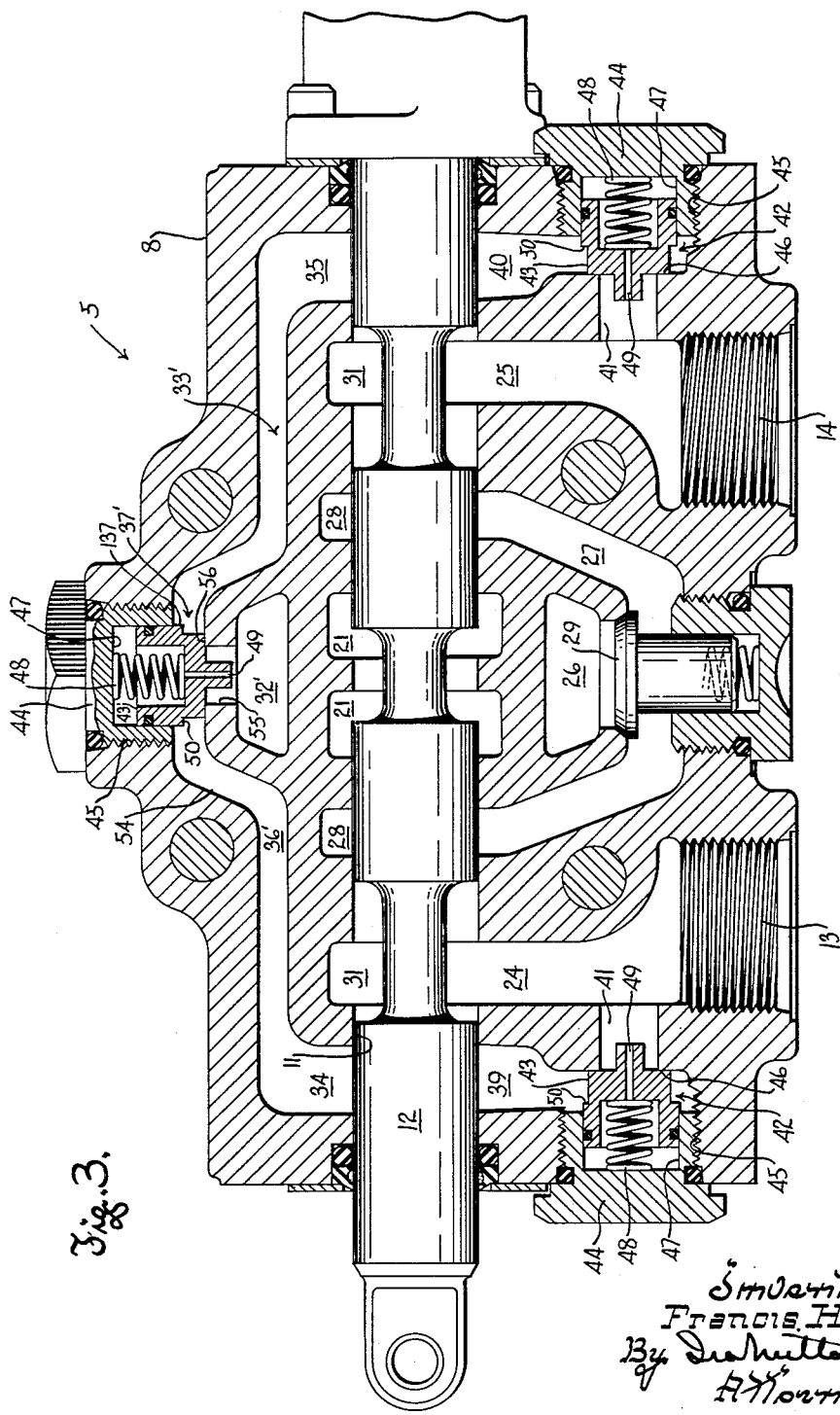
FIGURE 3 is a view similar to FIGURE 2 but showing a control valve incorporating a modified embodiment of the invention.

The two spool sections 8 and 9 may be substantially identical with one another, and each has a bore 11 therethrough in which a spool or valve element 12 is slidable in opposite directions from a neutral position, shown in FIGURES 2 and 3, to either of two operating positions at which the spool effects operation in one direction or the other of a double acting hydraulic cylinder or a similar reversible hydraulic motor (not shown) connected with motor ports 13 and 14 in the spool section body.

Hydraulic pressure fluid from a pump (not shown) or other source enters an inlet chamber 16 in the inlet section 6 through an inlet port 18. When the several spools are all in their neutral positions, pressure fluid can flow from the inlet chamber 16 to a return fluid chamber 20 in the exhaust manifold section 7 by way of an open center passage 21 that extends through the several body sections, intersecting the spool bores 11 therein intermediate their ends. The return fluid chamber opens to an outlet port 22 which in this case is shown as being in the exhaust manifold section 7 and which is connectable with a reservoir (not shown) or the like.

When any one of the spools 12 is moved to an operating position, it blocks the open center passage 21 and directs pressure fluid from the inlet chamber 16 to one or the other of a pair of service passages 24 and 25 that communicate the spool bore with the motor ports 13 and 14 respectively. In this case such diversion of fluid from the inlet chamber to a motor port is shown as being provided for by a feeder passage 26 extending through the several spool sections from the inlet chamber 16 and a U-shaped bridging passage 27 in each spool section which communicates the feeder passage 26 with zones 28 of the spool bore that are axially outward of the intersection of the open center passage with said bore. Those skilled in the art will recognize that this arrangement provides for parallel operation of motors controlled by the valves of the two spool sections 8 and 9, and that with a different but well known arrangement of passages the valve could provide for series-parallel operation of motors governed by the two spools 12.

Each bridging passage 27 has its bight portion communicated with the feeder passage 26 through a back pressure check valve 29. The zones of communication 28 of the bridging passage legs with the spool bore are spaced lengthwise inwardly of said bore from the zones 31 at which the service passages 24 and 25 intersect the bore, and the bridging passage is disposed at the same side of the spool bore as the service passages.

At the same time that a spool in an operative position is directing pressure fluid to one of its associated service passages, it communicates its other service passage with an exhaust header 32 that extends through the several valve body sections and opens at one end to the return fluid chamber 20, whence such return fluid can of course pass to the outlet 22 and a reservoir connected therewith. In this case communication through the spool bore between the service passages and the exhaust header 32 is provided for by a substantially U-shaped return fluid passage 33 having its legs 34 and 35 intersecting the spool bore at zones spaced lengthwise thereof from one another and outwardly adjacent to the zones 31 at which the service passages 24 and 25 intersect the bore. Attention is directed to the fact that the bight portion 36 of the return fluid passage is located at the side of the spool bore opposite to the service passages and the bridging passage 27, and is near the exhaust header 32. Communication between the return fluid passage and the exhaust header is through flow restricting means 37 opening from the bight portion 36 of the return fluid passage; hence return fluid entering either leg of said passage must pass through the flow restricting means 37 in order to enter the exhaust header, and the single flow restricting means thus serves both branches of the return fluid passage.

Each leg of the return fluid passage extends beyond the spool bore a distance toward the side of the valve body to which the motor ports 13 and 14 open, to provide extensions 39 and 40 of the return fluid passage which parallel the service passages 24 and 25 respectively. Each of these extensions communicates with its adjacent service passage through a short by-pass 41 parallel to the spool bore and controlled by a void control check valve 42.

Each of the void control check valves 42 is of a type which presents relatively slight restriction to flow of fluid from the return fluid passage to its associated service passage, and this is of course important because the check valve must open to provide for void control in response to a relatively small excess of fluid pressure in the return fluid passage over that in the service passage, which low pressure differential is not conducive to a high flow rate through the by-pass 41. The feature of the check valve that affords this favorable type of operation is that its poppet 43 moves in a direction counter to that in which it permits fluid to flow, thus in effect moving out of the way of the fluid.

Specifically, each check valve comprises a cup-shaped cylindrical valve body 44 that provides both a guide for the poppet 43 and a plug which is threaded into a bore 45 in the side wall of the spool section. The bore 45 is coaxial with the by-pass 41 and of course provides for access to the interior of the valve body to permit the by-pass 41 to be bored and to provide for machining an annular seat 46 coaxial with the by-pass and facing the service passage.

The cup-shaped valve body 44 has an inwardly opening well 47 therein in which the plunger-like poppet 43 is slidable toward and from engagement with the seat 46 and in which there is a coiled compression spring 48 that reacts between the body and the poppet. A small coaxial bore 49 in the poppet communicates the portion of the body 44 which is behind the poppet with the service passage, through its associated by-pass, and the pressure of fluid in the service passage, manifested upon the rear of the poppet through said bore 49, cooperates with the spring 48 to normally maintain the poppet engaged with its seat. The forces tending to seat the poppet are opposed by the pressure of fluid in the return fluid passage 33, manifested upon an annular shoulder 50 on the poppet that is spaced behind its seat engaging surface.

When fluid in either service passage 24 or 25 drops to a pressure which is below that of fluid in the return fluid passage (i.e., when a void tends to be drawn in the service passage) the poppet of the void control valve 42 associated with that service passage moves away from its seat in response to the force which the higher pressure fluid in the return fluid passage exerts upon the annular shoulder 50, permitting return fluid to flow through the by-pass 41 and into the service passage. The poppet tends to maintain a position at which it holds a constant pressure difference between the service and return fluid passages, but in doing so it must move farther away from its seat with decreasing pressure in the service passage, thus providing for higher flow rates when they are most needed. This is in contrast to the conventional ball check valve or the like, which, once open, provides a fixed restriction to fluid flow and therefore produces greater throttling effect with increasing rates of flow.

As pointed out hereinabove, the outlet of the valve body is normally connected with a reservoir or the like in which fluid is at or only slightly above atmospheric pressure, and hence if the return fluid passage 33 were unrestrictedly communicated with the exhaust header 32, fluid pressure in either service passage would have to drop to a substantially low value before the check valve 42 associated with that service passage would open. However, when return fluid is entering the return fluid passage from one of the service passages at a substantially high flow rate, as is the case under conditions at which a void might be drawn at the other service passage, the flow restricting means 37 imposes a back pressure upon such return fluid and consequently pressure in the service passage to which pressure fluid is being directed need not drop to a value below that of reservoir pressure in order to effect opening of the check valve, thus assuring that communication will be established between the return fluid passage and the service passage as soon as there is any indication of a need for drawing supplemental fluid from the return fluid passage to prevent the formation of a void.

Figure 1:
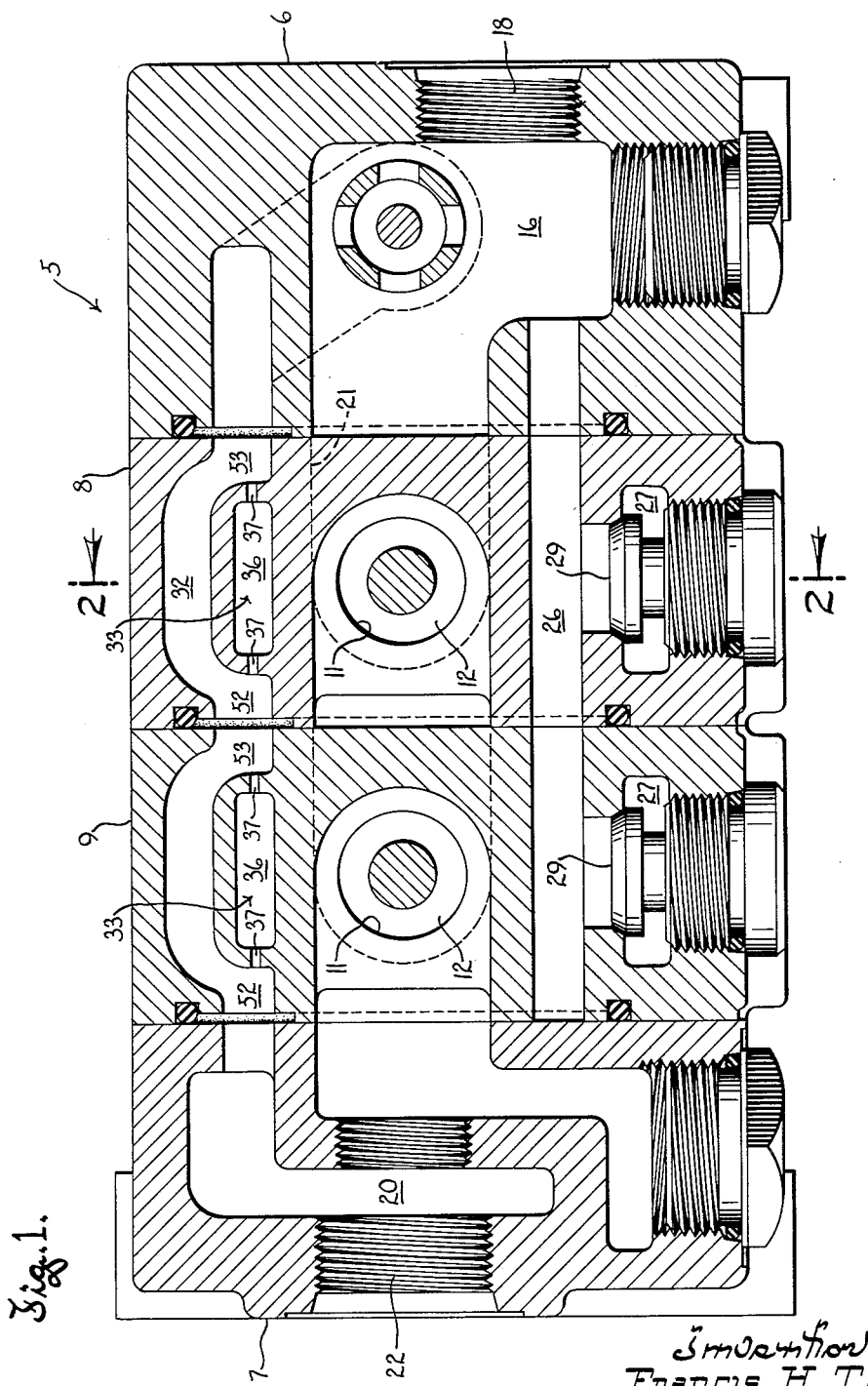
FIGURE 1 is a cross section view of a hydraulic control valve having a plurality of spools and which incorporates void control means embodying the principles of this invention.

In the embodiment of the invention illustrated in FIGURES 1 and 2 the bight portion 36 of the return fluid passage 33 is located between the spool bore and the exhaust header 32, and the segment of the exhaust header in each spool section is substantially U-shaped and has its legs 52 and 53 embracing the bight portion of the return fluid passage. In this case the flow restricting means 37 comprises an orifice bored from one or both legs of the exhaust header into the bight portion of the return fluid passage, and the legs 52 and 53 of the U that defines each exhaust header segment open outwardly of the valve body section at their outer sides to permit such orifices to be readily bored.

Under flow conditions corresponding to normal operation of the hydraulic system in which the control valve is connected the flow restricting means comprising the orifices 37 imposes little or no back pressure upon fluid in the return fluid passage 33. However when return fluid from one of the service passages enters the return fluid passage at a substantially high flow rate, under conditions in which a void might be drawn in the other service passage, the restricted orifices 37 tend to throttle the flow of return fluid, maintaining a pressure on fluid in the passage 33 which exceeds that obtaining at the outlet port 22 substantially in proportion to the amount by which flow of return fluid exceeds that which is normal.

In the embodiment of the invention illustrated in FIGURE 3 the exhaust header 32' is located between the spool bore 11 and the bight portion 36' of the return fluid passage, and the exhaust header is a substantially straight passage extending transversely to the spool bore. The medial section of the bight portion 36' of the return fluid passage is outwardly bowed, as at 54, to embrace the exhaust header, and the flow restricting means 37' comprises a pressure relief valve 137 which is identical in construction with the void control check valves 42 described above and which controls communication through a bored passageway 55 between the bowed section 54 of the return fluid passage and the exhaust header.

The seat 56 which is engaged by the poppet 43' of the valve 137 faces the return fluid passage 33', and hence the valve 137 tends to maintain a pressure in the return fluid passage which is at all times of a uniform value, somewhat higher than that obtaining in the exhaust header 32' and at the outlet port 22. Such back pressure is not high enough to interfere with efficient operation of a hydraulic motor controlled by the valve but is sufficiently high to insure dependable operation of the void control check valves.

In the control valves described above provision is made for void control only when the spool is in one or the other of its operating positions, since the return fluid passage is not otherwise in communication with a service passage. However it is often desirable to provide high pressure relief for either service passage concurrently with void controlling flow of fluid to the other at a time when the spool is in its neutral or "hold" position, as well as providing for void control when the spool is in its operating positions. The control valves illustrated in FIGURES 4–8 provide for this type of operation and feature an unusually compact body.

In the valve shown in FIGURES 4–6, the return fluid passage 33 again communicates with the exhaust header through a pressure relief type of flow restricter 137 like that in the FIGURE 3 embodiment, and the return fluid passage has its legs extended beyond the spool bore, as at 39 and 40, to parallel the service passages 24 and 25. However, communication between the return fluid passage 33 and the respective service passages 24 and 25, through the short by-passes 41, is controlled by a dual function valve unit 70 of the type disclosed in the above mentioned copending application of Francis H. Tennis and Donald G. Bethke, Serial No. 186,906, which unit serves not only as a check valve that permits fluid to flow from the return fluid passage to the service passage, but also as a high pressure relief valve which permits fluid to flow from the service passage into the return fluid passage, in by-pass relation to the spool bore, when pressure in the service passage exceeds a predetermined value higher than that normally produced by the pump. Hence incorporation of the valve 70 into the control valve body provides for both cross-over relief and void control without requiring the control valve body to be any larger than is necessary to accommodate the U-shaped return fluid passage 33 and the two by-passes 41, which would normally be present in some form in any conventional control valve.

For details of the valve unit 70 reference may be made to said copending application. Suffice it to say that, as best seen in FIGURE 6, the unit comprises a hollow low pressure poppet 71 and an inner high pressure poppet 72 that is slideable relative to the outer poppet in the front portion of the latter. The outer poppet is mounted for piston-like sliding motion in a cup-shaped body 73 that provides a cylinder and which is mounted on the exterior of the control valve body coaxially with the by-pass 41. In this case the front of the outer or low pressure poppet is adapted for seating engagement with an annular valve seat 74 surrounding the by-pass 41 at its junction with the return fluid passage 33, and the outer poppet is lightly biased toward said seat by a spring 75 confined in the rear of the cylinder provided by the body 73. There is a high pressure relief passage in the hollow front portion of the outer poppet, one end of which is defined by a coaxial hole 76 in the front of the outer poppet, opening forwardly to the by-pass 41 and rearwardly into the interior of the outer poppet through a second rearwardly facing valve seat 77, upon which the inner or high pressure poppet normally seats. The other end of the high pressure relief passage opens from the hollow interior of the outer poppet and to the return fluid passage 33 through one or more radial holes 78 in the side of the outer poppet.

A stem 80 cooperates with the outer and inner poppets to guide the latter for back and forth sliding motion toward and from its seat 77, and the inner poppet is biased forwardly toward said seat by a strong compression spring 81 that encircles said stem. The tubular stem 80 affords communication between the service passage and the cylinder space in the rear of the body, behind the outer poppet, so that fluid at high pressure normally acts on the rear of the outer poppet to hold it seated. It will be apparent that the strong spring 81 holds the inner poppet seated when fluid in the service passage is at normally high values, but permits it to be moved off its seat to open the high pressure relief passage through the front portion of the outer poppet when an abnormally high pressure of fluid in the service passage is manifested upon the front of the inner poppet. So long as pressure of fluid in the service passage, and hence in the cylinder space behind the outer poppet, is higher than that of fluid in the return passage, the outer poppet remains seated. However, when pressure of fluid in the return passage exceeds that of fluid in the service passage, such higher pressure, manifested on an annular shoulder 84 on the front of the outer poppet, behind its seat engaging surface, forces the outer poppet away from its seat to open the low pressure relief passage provided by the by-pass 41, thus permitting return fluid to flow into the service passage.

The embodiment of the invention shown in FIGURES 7 and 8 utilizes a dual function pilot operated valve unit 90 of a type disclosed in the aforesaid application of Francis H. Tennis, Serial No. 153,415, to control communication through each of the by-passes 41, and also employs a third unit to control communication between the return fluid passage 33 and the exhaust header 32. Details of that valve unit can be found in said copending application.

Briefly, considering the unit 90 as it controls communication through a by-pass 41, it comprises a body 91 in which a plunger-like outer poppet 92 is axially slidable toward and from engagement with a seat 74' which corresponds to the seat 74 for the low pressure poppet of the valve unit 70 in the FIGURES 4–6 embodiment of this invention. The seat 74' thus faces toward the return fluid passage 33 and coaxially surrounds the by-pass 41. The outer poppet is, again, a low pressure responsive valve element, having an eccentric axially extending passage 93 therein that communicates the by-pass 41 with the cylinder space in the valve body 91 which is behind said poppet, and the outer poppet is urged toward its seat 74' by the pressure of fluid behind it plus the biasing force exerted by a coiled compression spring 94. Pressure of fluid in the return fluid passage 33 is exerted upon an annular forwardly facing surface 95 on the outer poppet, spaced behind its seat engaging surface, and when such such pressure exceeds that in the by-pass 41 the outer poppet moves away from the seat 74' for void control flow of fluid from the return fluid passage to the service passage.

Slidable in the outer poppet is an inner pilot poppet 96 which normally blocks flow of fluid through a vent passage in the outer poppet and which is biased forwardly relative to the outer poppet by a compression spring 97. The vent passage is defined by the passage 93, a coaxial bore 98 in the front portion of the outer poppet which the passage 93 intersects and which opens rearwardly to a counterbore 99 in which the inner poppet is located, and one or more lateral bores 100 opening radially from the counterbore to the service passage. The seat for the inner poppet is defined by the junction of the bore 98 with the counterbore 99, and the inner poppet is biased forwardly toward said seat with an adjustably variable force by reason of the fact that the spring 97 reacts against a seat 101 that is threaded into the rear of the outer poppet and is adjustable axially by means of an adjusting mechanism 102 described in the aforesaid copending application Serial No. 153,415.

The inner poppet 96 is moved off of its seat in response to fluid pressure above a predetermined value in the by-pass 41, which pressure is manifested upon a small plunger 103 that is freely movable axially in the bore 98. So long as such fluid pressure exceeds the value for which the pilot spring 97 is adjusted, the plunger will hold the pilot poppet 96 unseated, permitting fluid to be vented from behind the outer poppet through the vent passage 93, 98, 99 and 100; and such venting of fluid from behind the outer poppet permits the latter to be moved off of its seat in response to the pressure of fluid in the by-pass 41 manifested upon its front end. When the valve unit is thus effecting high pressure relief, with the small plunger 103 in its rearward position, said plunger partially blocks the intersection of the bore 98 and the eccentric passage 93, restricting flow of fluid into the rear portion of the body and thus preventing chattering of the outer poppet.

When a void tends to be drawn in the service passage the small plunger 103 is moved forwardly, providing for substantially unrestricted flow of fluid from behind the outer poppet to the by-pass, by way of the passage 93, thus insuring rapid and dependable check valve operation of the unit.

Thus the valve unit 90, while slightly more expensive than the valve unit 70 previously described, is somewhat more accurately responsive to differences between the pressures in the service and return fluid passages and has the additional very important advantage of being adjustable to permit predetermination of the value of fluid pressure in the service passage at which it will open for high pressure relief.

Obviously the flow restricting means 37 can be of any desired type when the valve units 90 are employed to control communication through the by-passes 41, but in this instance another valve unit 90, of the type disclosed in the aforesaid Tennis application, Serial No. 153,415, is shown as comprising the flow restricting means. Adjustability of the pressure at which such a unit relieves permits it to be set so that it maintains the desired small back pressure in the return fluid passage 33, and releases fluid from said passage into the exhaust header whenever the predetermined back pressure value is exceeded. The check valve function of the unit is valuable because it permits fluid to be drawn back from the exhaust header and the reservoir to which the same is connected under extreme conditions where pressure fluid supplied by the pump, together with return fluid from one service passage, is insufficient to completely prevent the drawing of a void in the other service passage.

From the foregoing description taken together with the accompanying drawings it will be apparent to those skilled in the art that this invention provides a hydraulic control valve of the type having a valve element shiftable in opposite directions to a pair of operating positions, which control valve is provided with void control means associated with each service passage in the valve body, and means for insuring prompt and dependable operation of such void control means, but which control valve is nevertheless very compact and easy and inexpensive to manufacture. It will also be apparent that the control valve of this invention incorporates very efficient but nonetheless compact means for affording cross-over relief whereby return fluid from one service passage associated with a valve spool can be transferred to the other service passage to prevent the drawing of a void in said other, such cross-over relief means being effective both when the spool is in a neutral position and in one of its operating positions.

What is claimed as my invention is:

1. A hydraulic control valve including a body having a bore, a pair of service passages leading from the bore, separate fluid supply and return passages that connect with the bore, and a valve element in the bore shiftable in opposite directions to selectively communicate either service passage with the supply passage and the other service passage with the return passage, characterized by the following:

(A) that said service and return passages have portions thereof adjacent to one another;

(B) that the body has a pair of bypasses, one associated with each service passage, each bypass having inner and outer ends that respectively open to its associated service and return passage portions to afford communication therebetween;

(C) that pressure responsive valve mechanisms in the body, one for each bypass, and located, wholly outside its associated service passage, control fluid flow through said bypasses, and each of said valve mechanisms comprises, (1) a cylinder opening forwardly to the associated return passage portion at a location opposite the outer end of its associated bypass and substantially coaxial with the latter, (2) a plunger-like reverse acting check valve in each cylinder, extensible forwardly therefrom into the return passage to a bypass closing position at which the front of the check valve engages said outer end of its associated bypass and receives the forces of pressure fluid in the associated service passage that tend to unseat the check valve, (3) passage means communicating the service passages with their respective cylinders so that pressure fluid from the service passages can exert force on the rear of their respective check valves to normally hold them closed, and through which passage means fluid in the cylinders can be exhausted to the service passages during opening of their respective valves, and (4) a forwardly facing external surface on the from portion of each check valve, upon which pressure fluid in the return passage exerts force to effect retraction of said front portion of the check valve to open its associated bypass whenever the pressure of such return fluid exceeds that of fluid in its associated service passage, to thus permit return fluid to flow through its bypass to the associated service passage substantially unrestricted by the check valve.

2. The valve of claim 1, further characterized by the fact that the return fluid passages communicate with an exhaust passage in the body through flow restricting means by which a back pressure is maintained on fluid in the return fluid passages when return fluid flows from one of the service passages at a substantially high rate.

3. The valve of claim 2 wherein said flow restricting means comprises a valve unit of the type defined by sub-paragraph B of claim 1, having its said seat facing the return fluid passage so as to function as a relief valve.

4. A hydraulic control valve including a body having a bore, fluid supply passage means communicating with the bore, two pairs of adjacent service and return passages that open to the bore at zones spaced apart lengthwise of the bore, an exhaust header with which both of the return passages communicate, and a spool in the bore slideable to each of a pair of operating positions to selectively communicate either service passage with the supply passage means and the other service passage with its adjacent return passage, further characterized by the following:
  (A) that each return passage is communicable with its adjacent service passage through a bypass in the body opening at one end to one side of its return passage;
  (B) that the body contains valve devices, one for each bypass, to govern fluid flow therethrough, and located at the opposite side of its associated return passage and remote from the adjacent service passage, each valve device comprising
    (1) a reverse acting check valve,
    (2) means responsive to the pressure of fluid at normally high values within the associated service passage and its bypass for effecting motion of the check valve toward said one side of its return passage to a bypass closing position within its return passage,
    (3) and means responsive to a drop in pressure in said service passage to a value below that of fluid in its adjacent return passage for effecting motion of the check valve toward said opposite side of its return passage to a bypass open position at which it provides for substantially unrestricted flow of fluid from its return passage through the bypass to its associated service passage;
  (C) and means for assuring fast opening of the check valves comprising flow restricting means in the body, through which the return passages are communicated with the exhaust header, and by which back pressure is maintained on fluid entering either return passage at higher than normal rates from its associated service passage.

5. The hydraulic control valve of claim 4, further characterized by the fact that said flow restricting means comprises a valve element yieldingly biased toward a seat and responsive to varying rates of fluid flow in the return fluid passages to be moved away from its seat in response to increasing flow rate, whereby fluid in the return passages tends to be maintained at a pressure which is at all times substantially uniform and higher than that obtaining in the exhaust passage.

6. The hydraulic control valve of claim 4, further characterized by the fact that said flow restricting means comprises means defining a throttling orifice communicating the return passages with the exhaust passage.

7. A control valve for a reversible fluid pressure operated motor, comprising:
  (A) a body having
    (1) a pair of service passages that are connectable with opposite sides of a fluid pressure operated motor to be governed by the control valve,
    (2) fluid supply means, and
    (3) fluid return means including a pair of return branches that are communicated with one another and each of which is alongside one of the service passages, and a return passage common to both return branches;
  (B) a shiftable spool in the body movable from a neutral position at which the spool blocks communication between the service passages and both the supply and return means, to each of a pair of operating positions to selectively connect either service passage with the supply means and the other service passage with its adjacent return branch;
  (C) means in the body providing a pair of bypasses, one for each service passage, through which the service passage may be communicated with its adjacent return branch;
  (D) means in the body responsive to an increase in fluid pressure in either service passage to an abnormally high value and a decrease in fluid pressure in the other service passage to an abnormally low value to effect by-pass of fluid from the higher pressure service passage to its fluid return branch and transfer of such bypassed fluid from the other return branch to the lower pressure service passage, said last named means comprising a valve unit for each by-pass to control the effectiveness thereof, each of said valve units being located at the side of its return branch remote from the adjacent service passage, and including
    (1) a high pressure relief valve mechanism that is adapted to open and effect communication between its corresponding service passage and return branch in response to an abnormally high pressure in said service passage, and
    (2) a void control valve mechanism which opens in response to the differential in pressure that results from decrease in fluid pressure in the corresponding service passage to a value below that of fluid in the return branch associated therewith; and
  (E) means in the body providing restricted communication between each of said return branches and their common return passage, so that the pressure of fluid by-passing from either service passage to its associated return branch through the high pressure relief valve mechanism common thereto will be quickly raised to thereby assure prompt and positive opening of the void control valve mechanism associated with the other service passage.

8. In a control valve for a reversible hydraulic motor, the combination of:
  (A) a body having
    (1) a bore,
    (2) a pair of service passages opening from the bore at zones spaced apart axially thereof and connectable with a reversible hydraulic motor to be governed by the control valve,
    (3) fluid supply means connectible with the service passages through the bore,
    (4) fluid return means including
      (a) a common return passage, and
      (b) a pair of communicated branches, each alongside and adjacent to one of the service passages and communicating with the bore at a zone spaced from the zone of communication of its adjacent service passage with the bore;
  (B) a control spool shiftable in the bore between a neutral position blocking communication between the service passages and both the supply and return means and each of a pair of operating positions at which the spool selectively directs pressure fluid from the supply means to either service passage while directing return fluid from the other service passage to the return branch adjacent thereto;
(C) means in the valve body providing a pair of bypasses, one for each service passage, for communicating the same with the adjacent return branch;
(D) valve means in the valve body for controlling flow of fluid through each by-pass, said valve means being located in the body at the side of each return branch remote from its adjacent service passage, and comprising
  (1) low pressure relief valve mechanism normally preventing flow of fluid from its service passage to the adjacent return branch,
    (a) said low pressure relief valve mechanism including an outer poppet movable away from the service passage in response to lower pressure therein than in its adjacent return branch, and
    (b) said outer poppet having a high pressure relief passage therein for communicating the service passage with its adjacent return branch when the low pressure relief valve is closed, and
  (2) high pressure relief valve mechanism including
    (a) an inner poppet carried by the outer poppet in its interior, and
    (b) means biasing said inner poppet toward a position normally closing said high pressure relief passage but yieldable to permit movement of the inner poppet relative to the outer poppet in response to an abnormally high fluid pressure in the service passage, and
(E) means in the body common to both return branches providing restricted communication between each of them and said return passage, so that the pressure of fluid by-passing from either service passage to its associated return branch through the high pressure relief valve mechanism common thereto will be quickly raised to thereby assure prompt and positive opening of the void control valve mechanism associated with the other service passage.

9. A hydraulic instrumentality of the type having a body with a pair of service passages therein, each connectible with one of the ports of a reversible hydraulic motor mechanism, and bypass means through which fluid can be transferred between said service passages, said instrumentality being characterized by:
(A) a pair of valve units, one associated with each service passage, for controlling flow of fluid through the bypass means, said valve units being located entirely outside the service passages and partly in adjoining portions of the bypass means, and each of said valve units comprising
  (1) a plunger-like valve element,
  (2) means defining an operating cylinder which slidably mounts the valve element, which cylinder is located behind a portion of the valve element and is communicated with the associated service passage so that fluid can flow therefrom into the cylinder where it tends to urge the valve element forwardly,
  (3) an annular seat in the adjoining portion of the bypass means, facing away from the associated service passage and located ahead of the valve element, toward which seat the valve element is urged to close off its service passage from the bypass means,
  (4) means on the valve element defining a forwardly facing surface upon which pressure fluid in the bypass means can act so that when fluid pressure in the bypass means exceeds that in the service passage with which the valve unit is associated the valve element is moved rearwardly away from its seat in a direction counter to that in which it permits fluid in the bypass means to flow to its associated service passage and thus presents little restriction to such flow of fluid;
(B) and means cooperating with said valve element, including a poppet that opens in response to pressure of fluid in the associated service passage which exceeds a predetermined high value, for relieving such high pressure by permitting fluid to flow from said associated service passage into the bypass means, so that fluid can flow in either direction between the two service passages via the bypass means to provide for both crossover relief and void control.

10. A hydraulic control valve of the type having a body with a pressure fluid supply passage connectible with a source of fluid under pressure and communicable with a spool bore in the body, an exhaust passage opening to an outlet, and a pair of service passages opening from the spool bore from zones spaced apart lengthwise thereof and connectible with a reversible hydraulic motor, and wherein a spool is slidable in opposite directions in the spool bore to each of a pair of operating positions to selectively communicate either of the service passages with the supply passage and the other service passage with the exhaust passage, said control valve being characterized by the following:
(A) the body has a U-shaped return fluid passage therein that is communicated with the exhaust passage and has legs which intersect the spool bore and are adjacent to the service passages so that the spool, in each of its operating positions, can direct return fluid from the service passage not then communicated with the pressure fluid supply passage into its adjacent leg of the return passage;
(B) each of the service passages is communicable with its adjacent leg of the return fluid passage through a bypass controlled by check valve means that blocks flow of fluid from the service passage to the return fluid passage but allows fluid flow in the reverse direction, so that when fluid tends to be drawn from one service passage at a rate higher than it can be supplied from a pressure fluid source with which the pressure fluid supply passage is connected, return fluid from the other service passage, flowing through the return fluid passage and the check valve controlled bypass opening from the leg of the return passage adjacent to said one service passage, can supplement the flow of fluid from said source and prevent drawing a void; and
(C) the exhaust passage has a U-shaped portion disposed in a plane substantially perpendicular to the plane of the return fluid passage and which embraces the bight portion of the return fluid passage so that communication between the return fluid passage and the exhaust passage can be provided for by a hole, extending from one leg of the exhaust passage into the bight portion of the return passage, of a size to provide a desired restriction to flow of fluid therethrough to thus control back pressure in the return fluid passage.

References Cited in the file of this patent

UNITED STATES PATENTS

| 2,367,682 | Kehle | Jan. 23, 1945 |
| 2,954,011 | Krehbiel | Sept. 27, 1960 |
| 2,980,136 | Krehbiel | Apr. 18, 1961 |
| 2,989,971 | Valentine | June 27, 1961 |

FOREIGN PATENTS

| 636,122 | Canada | Feb. 6, 1962 |